(12) United States Patent
Roy et al.

(10) Patent No.: US 11,743,138 B1
(45) Date of Patent: Aug. 29, 2023

(54) DISCOVERY OF PHYSICAL NETWORK ARCHITECTURE

(71) Applicant: VMware, Inc., Palo Alto, CA (US)

(72) Inventors: Piyush Roy, Pune (IN); Nilesh Avinash Phadke, Pune (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/707,645

(22) Filed: Mar. 29, 2022

(51) Int. Cl.
*H04L 41/22* (2022.01)
*H04L 41/0803* (2022.01)

(52) U.S. Cl.
CPC ......... *H04L 41/22* (2013.01); *H04L 41/0803* (2013.01)

(58) Field of Classification Search
CPC ..... H04L 41/40; H04L 41/0893; H04L 41/12; H04L 41/122; H04L 45/64; H04L 41/065; H04L 41/22; H04L 41/0803
See application file for complete search history.

(56) References Cited

U.S. PATENT DOCUMENTS

| | | | |
|---|---|---|---|
| 11,005,781 B2 * | 5/2021 | Zuo | H04L 49/1515 |
| 2015/0071286 A1 * | 3/2015 | de Silva | H04L 12/4641 370/392 |
| 2017/0358111 A1 * | 12/2017 | Madsen | H04L 41/12 |
| 2018/0262447 A1 * | 9/2018 | Nhu | H04L 49/555 |
| 2018/0329794 A1 * | 11/2018 | Prieto | G06F 11/3006 |
| 2019/0104207 A1 * | 4/2019 | Goel | H04L 45/16 |
| 2022/0217052 A1 * | 7/2022 | Mutnuru | H04L 41/0866 |

* cited by examiner

Primary Examiner — Glenton B Burgess
Assistant Examiner — Rachel J Hackenberg
(74) Attorney, Agent, or Firm — ADELI LLP

(57) ABSTRACT

Some embodiments provide a method for identifying network architecture in a datacenter. The method identifies connection information for multiple network elements. The connection information for each network element specifies other network elements to which the network element connects. The method assigns a set of the network elements to a set of two or more layers based on the connection information for the network element. The method uses the connection information to identify at least one group of network elements organized into a particular network architecture. The identified groups are for use in displaying user interface visualizations of the network elements of the datacenter.

25 Claims, 8 Drawing Sheets

DISCOVERY OF PHYSICAL NETWORK ARCHITECTURE

BACKGROUND

A typical datacenter (either a private datacenter or a public cloud datacenter) may contain hundreds, if not thousands, of network elements as well as host servers. The network elements can include switches, routers, middlebox appliances (firewalls, load balancers, etc.), as well as other devices. In addition, the hosts often execute virtual forwarding elements and virtual middlebox functions to implement overlay networks that are carried over the physical datacenter network elements.

Certain datacenter network monitoring and/or analysis applications (e.g., vRealize® Network Insight™ by VMware®) provide end-to-end network visibility and can show a layout of a datacenter network (e.g., for showing a packet path from a source to a destination within the datacenter). However, while the physical datacenter network may have a defined network topology (e.g., a leaf-spine architecture), this architecture may be unavailable to network monitoring tools unless information relating to the architecture can be extracted from network element configuration data. Such configuration data is not always available.

BRIEF SUMMARY

Some embodiments provide a method that uses connection information between network elements (e.g., switches, routers, middlebox appliances) in a datacenter to identify groups of network elements that are organized into a particular type of network architecture (e.g., a leaf-spine architecture). In some embodiments, a network monitoring and/or analysis application performs the network architecture identification in order to provide user interface visualizations of the network elements.

The datacenter network elements, in some embodiments, are physical underlay network elements of the datacenter that carry traffic between host computers in the datacenter. This data traffic may belong to multiple different overlay networks that are implemented, at least in part, by software forwarding elements (e.g., virtual switches, virtual routers, virtual middlebox appliances) that execute on the host computers. The architecture of these overlay networks is managed by a network management and control system, in some embodiments, and thus does not need to be extracted from connection information.

In some embodiments, the connection information for each network element specifies the other network elements to which that network element directly connects, as well as whether the network element connects directly to a host computer. For instance, host computers in a datacenter often connect to top-of-rack (TOR) or end-of-row (EOR) forwarding elements, but some embodiments do not include these forwarding elements in the architecture (e.g., if the architecture shows routers but the TOR/EOR forwarding elements are switches that provide a connection to the routers). In some embodiments, the connection information for the network elements is gathered based on traffic monitoring and thus does not require any configuration data.

Using this connection information, the network monitoring tool can identify multiple layers of network elements. In some embodiments, the layers are based on distance from the host computers. The network elements that directly connect to the host computers (or are closest to the host computers if there are intervening forwarding elements that are not incorporated into the identified architecture) are designated as a first layer, the network elements that directly connect to these first-layer network elements but do not connect to the host computers are designated as a second layer, and so on. In a typical leaf-spine architecture, the datacenter will have two or three layers of network elements.

Once the network elements are assigned to layers, the network monitoring application can identify groups of network elements that are arranged in a leaf-spine architecture (or other architecture). To identify groups of leaf-spine elements, some embodiments define a data structure representing connections between the network elements in a first layer and the network elements in a subsequent layer (e.g., the closest layer to the host computers and the next closest layer to the host computers). This data structure, in some embodiments, is a matrix that uses the network elements of one layer as the columns and the network elements of the next layer as the rows. Each entry in the matrix therefore represents a connection between one network element of each of these two layers and a single bit can be used to indicated whether a connection between these two network elements exists.

Groups of network elements satisfy a leaf-spine architecture, in some embodiments, if each network element in one layer connects directly to each network element in a second layer (commonly there are fewer network elements in each layer as distance from the host computers increases). Groups of network elements that satisfy these conditions can be found easily using the connection data structure described above. In some embodiments, any section of the matrix that is at least 2×2 and with all entries indicating a connection represents a group of network elements that are arranged in a leaf-spine architecture (i.e., every one of the network elements in one layer connects directly to every one of the network elements in the next layer). These groups can be identified and thus used by the network monitoring application as a leaf-spine section of the network in visualizations.

Groups of network elements can be amalgamated both vertically (across more than two layers) and horizontally (combining groups within a pair of layers) in some embodiments. For instance, some embodiments extend groups vertically by identifying multiple layers of leaf, spine, and super-spine. If the second-layer network elements of multiple different leaf-spine groups form a complete set of connections with a set of network elements in a third layer, then the collection of second-layer network elements will be identified as a lower layer in a leaf-spine architecture group with the third-layer network elements. These groups can then be combined into a single larger three-layer group, with this process repeated for as many layers as are found in the network.

In addition, some embodiments horizontally extend groups if there is an overlapping set of groups. For instance, two groups, each with a full set of connections from one layer to another, might also have some overlapping connections at their edges (i.e., first-layer network elements in the first group connecting to one or more second-layer network elements in the second group and vice versa). These overlapping sets of network elements will also be identified as a group based on the connection matrix, and this middle group can be used in some embodiments to stitch the groups together.

As mentioned, the network monitoring application uses the identified groups to display datacenter network visualizations in some embodiments. For instance, some embodiments enable a user to view paths within the datacenter from one data compute node (e.g., a virtual machine, container, bare metal computing device, etc.) to another data compute node (DCN). In some embodiments, these paths include both overlay network elements (indicated within the host computers) as well as physical underlay network elements. Rather than simply showing an unorganized set of network elements, the identified leaf-spine group (or groups) through which the data traffic passes can be visualized, with the specific network elements in each layer that process the traffic highlighted.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method that uses connection information between network elements (e.g., switches, routers, middlebox appliances) in a datacenter to identify groups of network elements that are organized into a particular type of network architecture (e.g., a leaf-spine architecture). In some embodiments, a network monitoring and/or analysis application (subsequently referred to as a network monitoring application or monitoring application) performs the network architecture identification in order to provide user interface visualizations of the network elements.

The network monitoring application of some embodiments may execute on a data compute node (e.g., a virtual machine, container, bare metal computing device, etc.) in the network that is monitored and analyzed, on a data compute node (DCN) separate from that network, on a set or cluster of such DCNs, etc. For example, the network monitoring application of some embodiments operates multiple DCNs for different purposes (e.g., one for data collection and other functions and another for performing analysis). The network monitoring application collects data (e.g., flow data, etc.) from network elements (e.g., physical switches and routers, middlebox appliances, etc.) and network endpoints (e.g., other DCNs). In some embodiments, the network elements include both physical underlay network elements (e.g., the physical switches and/or routers of a datacenter) as well as software network elements that implement one or more logical overlay networks and serve as the endpoints for underlay data traffic. The network monitoring application, in some embodiments, performs various types of analysis of the collected data and provides various analytics and visualizations to users. In some embodiments, the analysis includes generating an architectural layout of the datacenter network elements (i.e., the underlay network elements) which is used in various network visualizations.

Figure 1:
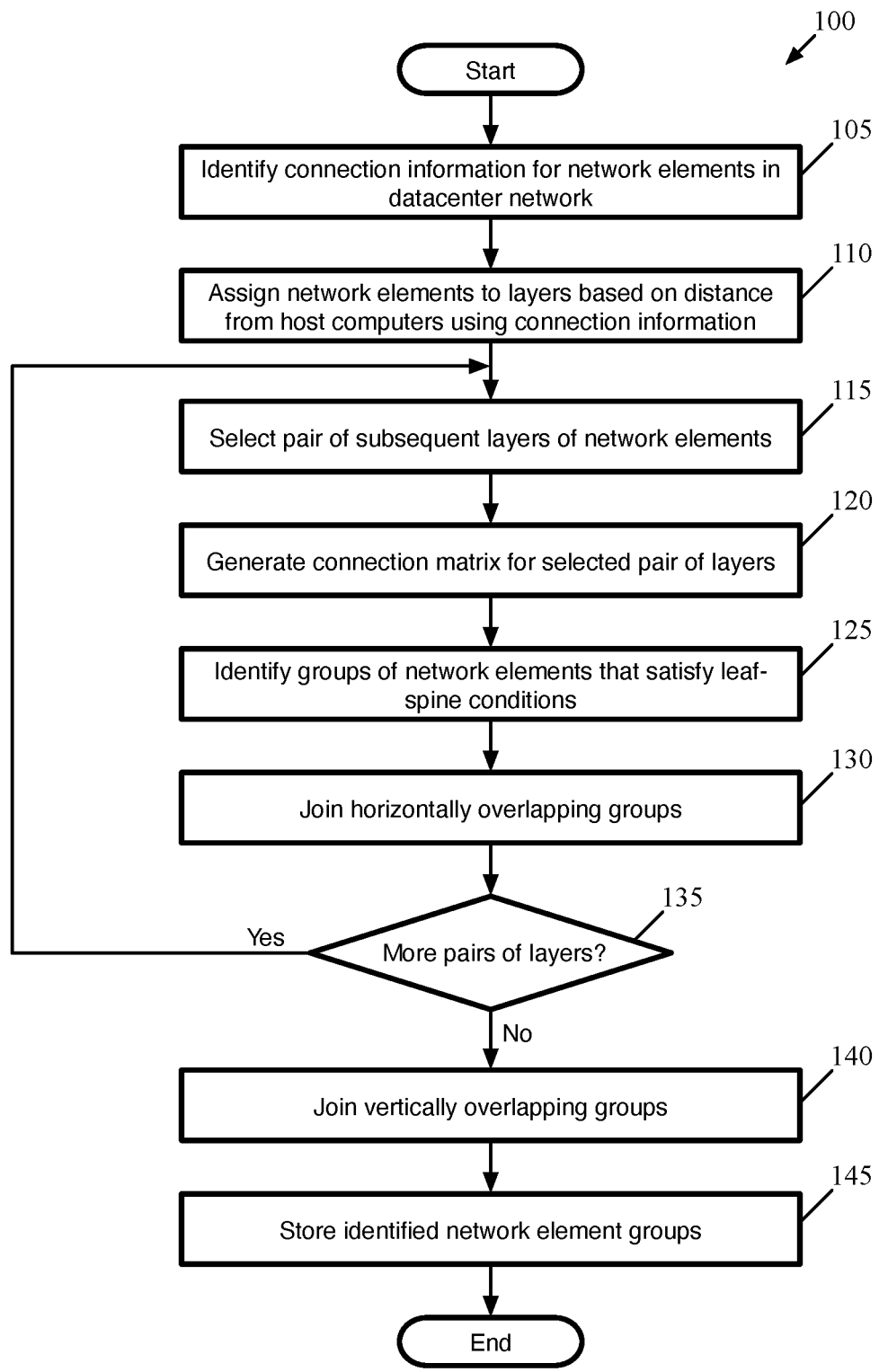
FIG. 1 conceptually illustrates a process of some embodiments for identifying groups of network elements that are organized in a particular network architecture.

FIG. 1 conceptually illustrates a process 100 of some embodiments for identifying groups of network elements that are organized (e.g., within a datacenter) in a particular network architecture (i.e., a leaf-spine architecture satisfying certain connectivity criteria). The process 100 is performed by a network monitoring application in some embodiments (e.g., the type of application described above). The process 100 will be described in part by reference to FIGS. 2-5, which conceptually illustrate various examples of network architectures and how those architectures are analyzed.

As shown, the process 100 begins by identifying (at 105) connection information for network elements in a datacenter network. As mentioned, in some embodiments these network elements are physical underlay network elements of the datacenter that carry traffic between host computers in the datacenter. This data traffic may belong to multiple different overlay networks that are implemented, at least in part, by software forwarding elements (e.g., virtual switches, virtual routers, virtual middlebox appliances) that execute on the host computers. The architecture of these overlay networks is managed by a network management and control system, in some embodiments, and thus does not need to be extracted from connection information. Instead, the overlay network architecture can be received as data from the network management and control system in some embodiments.

The underlay network elements may be switches, routers, middlebox appliances, or a combination thereof, depending on the datacenter. For identification of a leaf-spine architecture, the network monitoring application is primarily concerned with switches and/or routers. In some datacenters, the underlay network is a layer 2 network made up primarily of switches. Other datacenters, on the other hand, have a layer 3 underlay network primarily made up of routers.

In some embodiments, the connection information for each network element specifies the other network elements to which that network element directly connects, as well as whether the network element connects directly to a host computer. For instance, host computers in a datacenter often connect to top-of-rack (TOR) or end-of-row (EOR) forwarding elements, but some embodiments do not include these forwarding elements in the architecture (e.g., if the architecture shows routers but the TOR/EOR forwarding elements are switches that provide a connection to the routers). In some embodiments, the connection information for the network elements is gathered based on traffic monitoring or network adjacencies (e.g., for routers) rather than any sort of network element configuration data (which could vary between manufacturers).

Next, the process 100 assigns (at 110) the network elements to layers based on distance from the host computers using the connection information. That is, network elements that directly connect to the host computers (or are closest to the host computers if there are intervening forwarding elements that are not incorporated into the identified architecture) are designated as a first layer, the network elements that directly connect to these first-layer network elements but do not connect to the host computers are designated as a second layer, and so on. In a typical leaf-spine architecture, a datacenter will have two or three layers of network elements.

Figure 2:
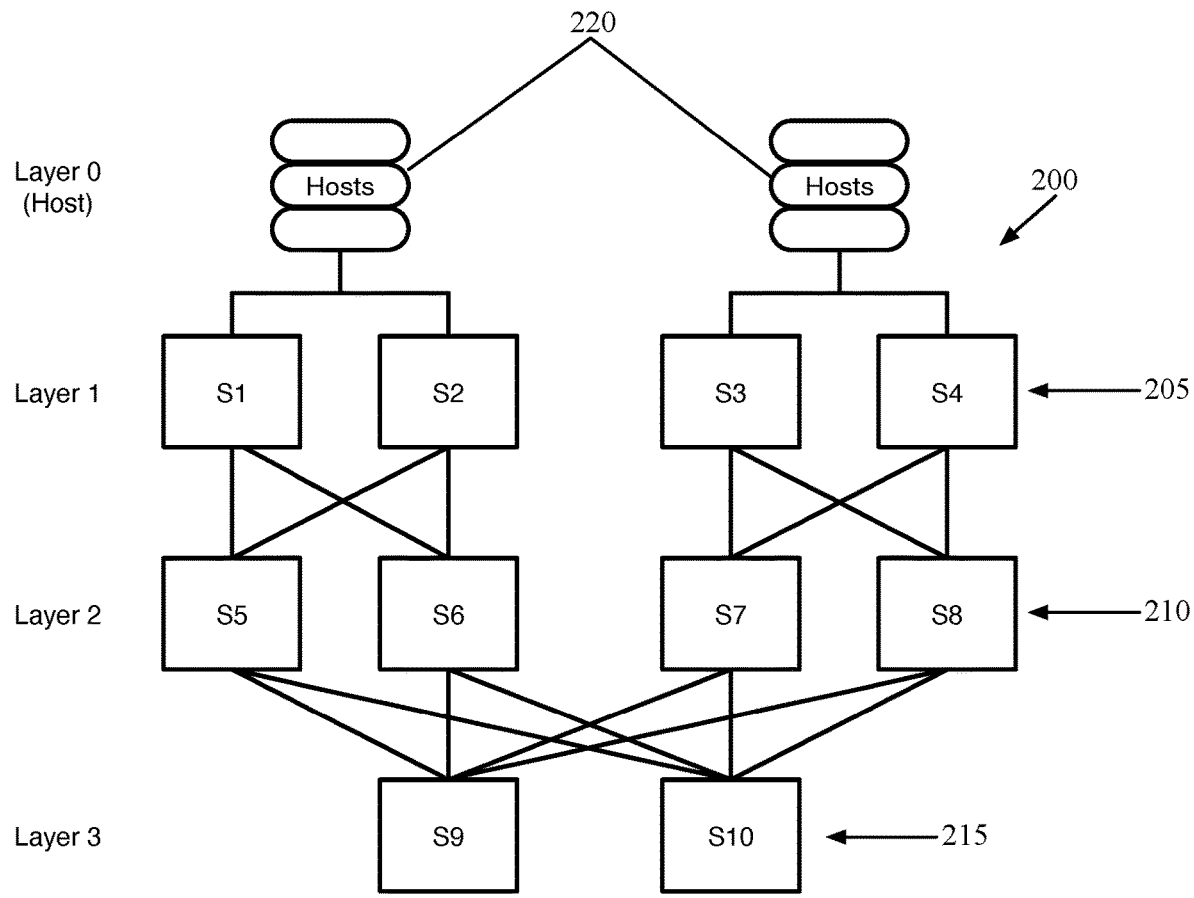
FIG. 2 conceptually illustrates an example of a datacenter with three layers of interconnected network element architecture.

FIG. 2 conceptually illustrates an example of a datacenter with three layers of interconnected network element architecture 200. In this and subsequent examples, the network elements (S1-S10) are switches (e.g., top of rack switches, aggregation switches, core switches). In other embodiments, however, the network elements are routers, a combination of switches and routers (e.g., a first layer of switches with one or more layers of routers), or elements that perform both routing and switching. As shown, a first layer ("Layer 1") 205 of switches S1-S4 are directly connected to the racks of hosts 220 (referred to as "Layer 0"). Switches S5-S8 in a second layer ("Layer 2") 210 each connect directly to one or more of the first-layer switches S1-S4 and have no direct connection to the hosts 220, and are thus assigned to the separate second layer. Similarly, switches S9 and S10 in a third layer ("Layer 3") 215 each connect directly to each of the second-layer switches S5-S8 and have direct connection to either the first-layer switches S1-S4 or the hosts 220, and are thus assigned to the third layer.

Figure 3:
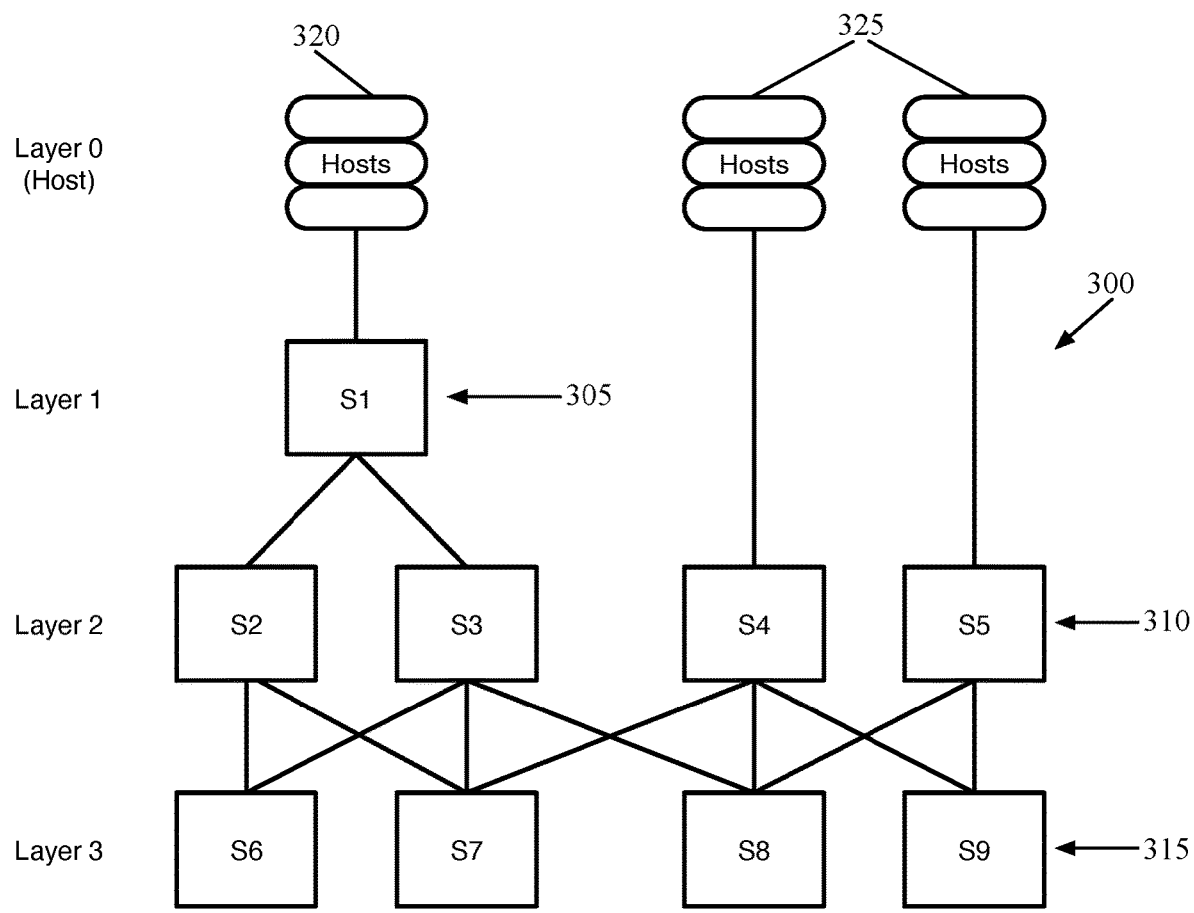
FIG. 3 conceptually illustrates an example of a datacenter with two primary layers of interconnected network element architecture as well as a separate third layer with a single network element.

In certain cases, the absolute number of hops from the hosts is not the only factor in determining the layer assignment. FIG. 3 conceptually illustrates an example of a datacenter with two primary layers of interconnected network element architecture 300 as well as a separate third layer with a single network element. As shown, a first switch S1 connects directly to a first set of hosts 320. However, this switch S1 is assigned to its own individual layer ("Layer 1") 305 which is not considered part of the leaf-spine architecture. In this case, the layer assignments are most strictly based on distance from the switches S6-S9. These four switches S6-S9 are assigned to a third layer ("Layer 3") 315 while the switches S2-S5 that connect directly to these third-layer switches are assigned to a second layer ("Layer 2") 310. A single switch S1 is assigned to the first layer ("Layer 1") 305 that can be ignored in subsequent operations of the leaf-spine group identification process.

To determine that the first switch S1 should not be in the same layer as switches S4 and S5 (which are also directly connected to hosts 325), some embodiments identify that this would place S8 and S9 in the same layer as S2 and S3, but that there is a direct connection from S3 to S8. Similarly, there is a direct connection from S4 to S7, but this arrangement would have these switches separated by two layers. Assigning S1 to its own layer is the only layer assignment that does not result in some combination of direct connections within a layer and direct connections across multiple layers. While in theory a datacenter could be laid out in such an arrangement, in this example there is an alternate layer assignment (that shown in the figure) that indicates a neat arrangement of the switches S2-S9.

Once the network elements are assigned to layers, the network monitoring application can identify groups of network elements that are arranged in a leaf-spine architecture (or other architecture). In some embodiments, this group identification is performed by analyzing pairs of subsequent layers to identify sections of the network that satisfy criteria for leaf-spine architecture. Returning to FIG. 1, the process 100 selects (at 115) a pair of subsequent layers of network elements. Some embodiments start with the layers closest to the hosts, while other start at the layers furthest from the host (in a two-layer architecture, there is only one pair of layers). It should also be understood that the process 100 is a conceptual process and that if there are multiple pairs of layers (e.g., a three-layer network architecture has two such pairs) the analysis for each of the pairs of layers might be performed in parallel in some embodiments.

For the currently selected pair of layers, the process 100 generates (at 120) a connection matrix (or other data structure) representing connections between the network elements in one of the layers and the network elements in the subsequent layer. This connection matrix, in some embodiments, represents the network elements of one layer (e.g., the layer closest to the host computers) in the columns and the network elements of the subsequent layer (e.g., the layer next closest to the host computers) in the rows. Each entry in the matrix (having a column and a row) represents a connection between the column network element (from the first layer) and the row network element (from the subsequent layer). Some embodiments use a single bit to indicate whether a direct connection between these two network elements exists (e.g., a 1 to indicate a direct connection and a 0 to indicate that no direct connection exists, or vice versa).

Using this matrix, the process 100 identifies (at 125) groups of network elements in the pair of layers that satisfy leaf-spine conditions. Groups of network elements satisfy a leaf-spine architecture, in some embodiments, if each network element in one layer connects directly to each network element in a second layer. Though not a necessary condition, there are typically fewer network elements in each subsequent layer as distance from the host computers increases.

Groups of network elements that satisfy these conditions can be found easily using the connection matrix of some embodiments described above. In some embodiments, any section of the matrix that is at least 2×2 and with all entries indicating a connection (e.g., all entries set to 1) represents a group of network elements that are arranged in a leaf-spine architecture (i.e., every one of the network elements in one layer connects directly to every one of the network elements in the next layer).

Figure 4:
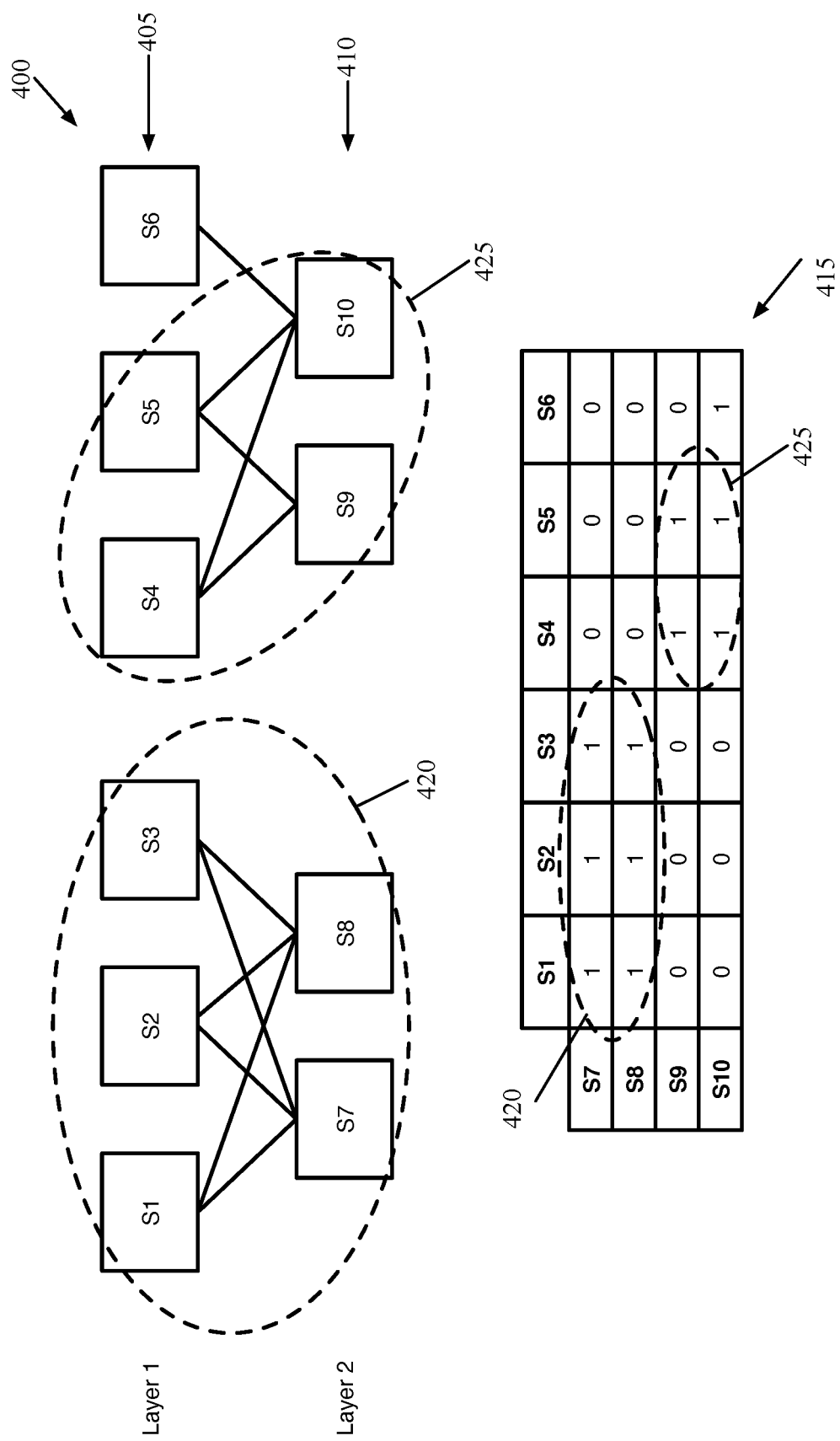
FIG. 4 conceptually illustrates a section of network architecture arranged in two layers with two regions satisfying leaf-spine conditions, as well as the connection matrix for these network elements.

FIG. 4 conceptually illustrates a section of network architecture 400 with ten network elements arranged in two layers 405 and 410 with two regions satisfying leaf-spine conditions, as well as the connection matrix 415 for these network elements. In this example, switches S1-S6 are in the first layer 405 while switches S7-S10 are in the second layer 410. As such, the connection matrix 415 includes six columns (one for each of the first-layer switches S1-S6) and four rows (one for each of the second-layer switches S7-S10). Each of the entries indicating presence of a connection between any of switches S1-S3 in the first layer and switches S7-S8 in the second layer are set to 1 because these connections exist. However, as switches S1-S3 do not connect to either S9 or S10, these six entries are set to 0 in the connection matrix 415. First-layer switches S4-S6 do not have any connections to switches S7-S8, so these corresponding entries are also set to 0. Switches S4-S5 connect to S9-S10, so these four entries are set to 1. Switch S6 only connects to switch S10 in the second layer, so the connection matrix has an entry set to 0 indicating there is no connection to switch S9 and an entry set to 1 to indicate the connection to S10.

As noted, rectangular matrix sections in which all of the entries indicate a connection (e.g., are set to 1) indicate a group of network elements that satisfies conditions for a leaf-spine architecture. Thus, first-layer switches S1-S3 and second-layer switches S7-S8 form one such group 420 while first-layer switches S4-S5 and second-layer switches S9-S10 form a second such group 425. Although first-layer switch S6 also connects to second-layer switch S10, it is not considered part of this group because no connection to S9 is present. In addition, as noted, some embodiments require at least two network elements in each layer. That is, a 1×2 or 2×1 section of the connection matrix (representing only three network elements) is not considered large enough to be identified as a leaf-spine group in such embodiments.

The connection matrix process described above, however, can be susceptible to mis-ordering of the network elements. For instance, if the order of S8 and S9 was switched in the matrix (and without any prior evaluation of the connections beyond layering, there is no guarantee that the network elements would be ordered properly), then there would not be a group of network elements that could be identified from a 2×2 or larger section of the matrix. As such, some embodiments, rather than generating a single connection matrix for the entire pair of layers, generate individual smaller connection matrices. Some such embodiments identify sets of potential network element groups so as to properly evaluate the connections within those groups first.

Specifically, some embodiments first identify the connected set of network elements for each individual network element. For instance, in the network architecture 400, the set P1 (representing connections of S1)={S7, S8}. The other sets in this area of the network are P2={S7, S8}, P3={S7, S8}, P7={S1, S2, S3}, and P8={S1, S2, S3}. A set L1_A={S1, S2, S3} can be created as the intersection of P7 and P8, while a set L2_A={S7, S8} can be created that is the intersection of P1, P2, and P3. Some embodiments create these sets as the intersections of overlapping groups.

The other portion of the network architecture 400 has the sets P4={S9, S10}, P5={S9, S10}, P6={S10}, P9={S4, S5}, and P10={S4, S5, S6}. Here, a set L1_B={S4, S5, S6} can be created as the intersection of P9 and P10, while a set L2_B={S9, S10} can be created that is the intersection of P1, P2, and P3. Based on these sets, a first potential group of {L1_A, L2_A} is formed and a second potential group of {L1_B, L2_B} is formed. Individual smaller connection matrices can then be generated for each of these potential groups. One such connection matrix would be the top-left quadrant of the connection matrix 415 and the other would be the bottom-right quadrant of the connection matrix 415.

Using these smaller connection matrices ensures that mis-ordering of network elements in the matrix does not lead to missed groups. Analysis of the smaller connection matrices results in the same groups 420 and 425 as shown in FIG. 4.

In some embodiments, the process 100 performs this connection matrix generation and analysis for each pair of layers, then ends. However, other embodiments also amalgamate groups of network elements both horizontally (combining groups of network elements within a pair of subsequent layers) and vertically (combining groups across more than two layers of network elements).

Thus, having performed this initial group identification for the currently selected pair of layers, the process 100 joins (at 130) any horizontally overlapping groups within the pair of layers. Specifically, if an identified group of network elements includes one or more network elements of another identified group, some embodiments combine the group. Other embodiments impose stricter requirements to join two groups, requiring that at least one network element in each of the two layers overlap between the two groups. Still other embodiments impose a requirement that first and second identified groups can be joined only if a third group is identified such that each network element in the third group is also in either the first group or the second group (with at least one network element in each layer in each of these other groups).

Figure 5:
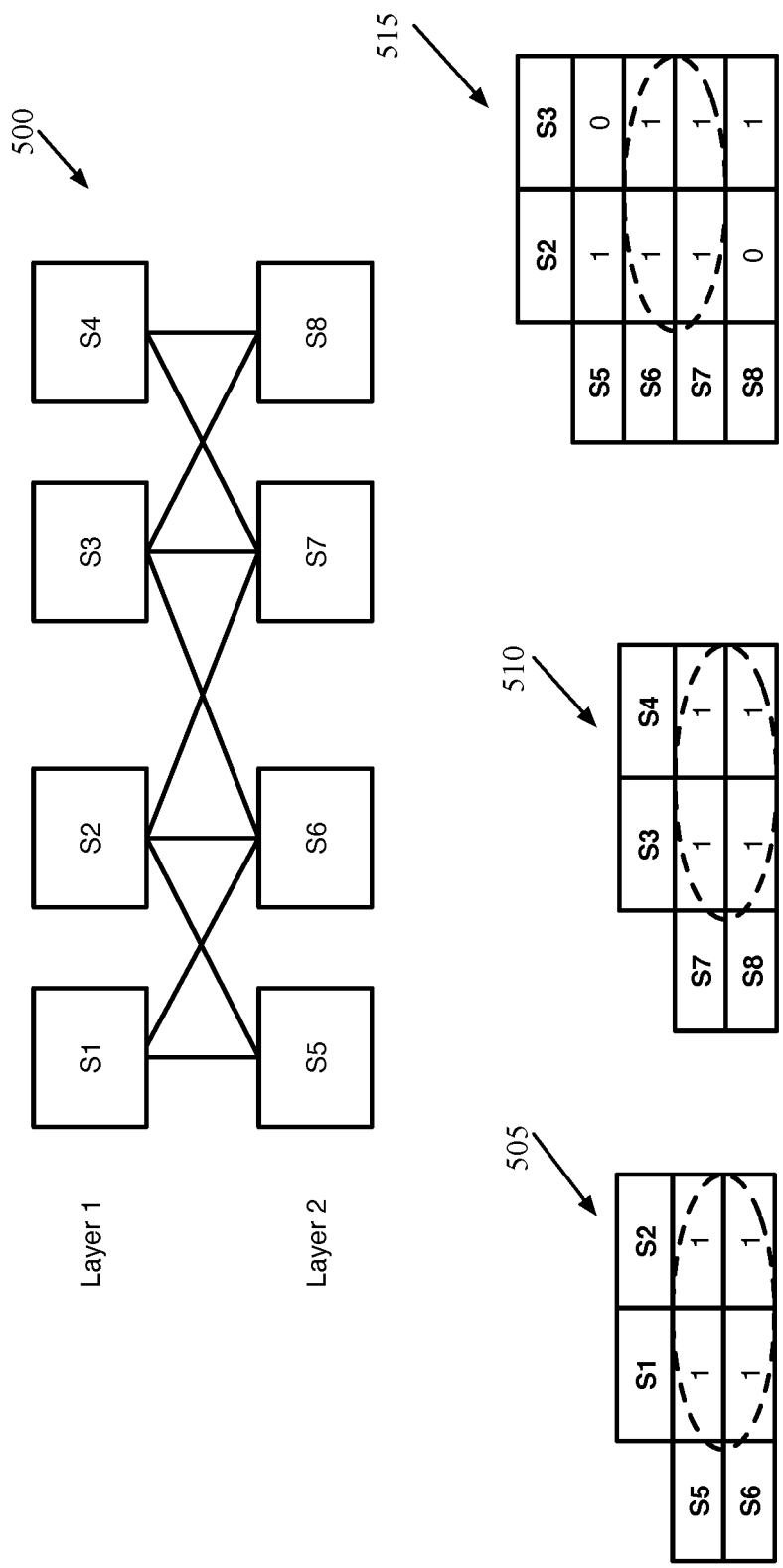
FIG. 5 conceptually illustrates an example of a two-layer network architecture in which groups are horizontally joined.

FIG. 5 conceptually illustrates an example of a two-layer network architecture 500 in which groups are horizontally joined. As shown, an initial analysis identifies three potential groups based on the overlapping sets of connections. The initial sets P1={55, S6}, P2={55, S6, S7}, P3={S6, S7, S8}, P4={S7, S8}, P5={S1, S2}, P6={S1, S2, S3}, P7={S2, S3, S4}, and P8={S3, S4} are all identified. From these, three potential groups are identified. The set L1_A={S1, S2} is the intersection of P5 and P6 and the set L2_A={55, 56} is the intersection of P1 and P2. The set L1_B={S2, S3} is the intersection of P6 and P7 and the set L2_B={S6, S7} is the intersection of P2 and P3. Finally, the set L1_C={S3, S4} is the intersection of P7 and P8 and the set L2_C={S7, S8} is the intersection of P3 and P4.

The figure shows three connection matrices 505-515 for these potential groups, with three separate groups {L1_A, L2_A}, {L1_B, L2_B}, and {L1_C, L2_C} identified as groups of network elements satisfying the conditions for leaf-spine architecture. Furthermore, all of the elements of the second group {S2, S3, S6, S7} either belong to the first group (for S2 and S6) or the third group (for S3 and S7). Based on this overlap, some embodiments combine all eight of these network elements into a single leaf-spine group.

Returning to FIG. 1, the process 100 then determines (at 135) whether any additional pairs of layers remain for analysis. Many datacenters arranged in clos network (leaf-spine) architecture only have two layers of network elements (e.g., a leaf layer and a spine layer), while some datacenters have a third layer of network elements (sometimes referred to as a super-spine layer). In some cases (e.g., for a very large datacenter), additional layers are possible, although significantly rarer. If additional pairs of layers of network elements remain, the process returns to 115 to select the next pair of subsequent layers (i.e., one of the layers from the previous pair of layers along with the next layer after that).

Once all of the pairs of layers have been evaluated, the process 100 joins (at 140) any vertically overlapping groups. In some embodiments, if higher-layer network elements of one or more groups in a first pair of layers are lower-layer network elements in a group in a second pair of layers, then the groups from the first pair of layers can be combined with the group in the second pair of layers as one large multi-layer group. This process can be repeated for as many layers as are found in the network. As with the horizontal joining conditions, different embodiments impose different requirements for joining groups vertically. Some embodiments require that all of the higher-layer network elements of a lower-pair group belong to a higher-pair group (as lower-layer network elements) for that lower-pair group to be included in a combined group, while other embodiments only require that a subset of the higher-layer network elements of the lower-pair group belong to the higher-pair group.

Figure 6:
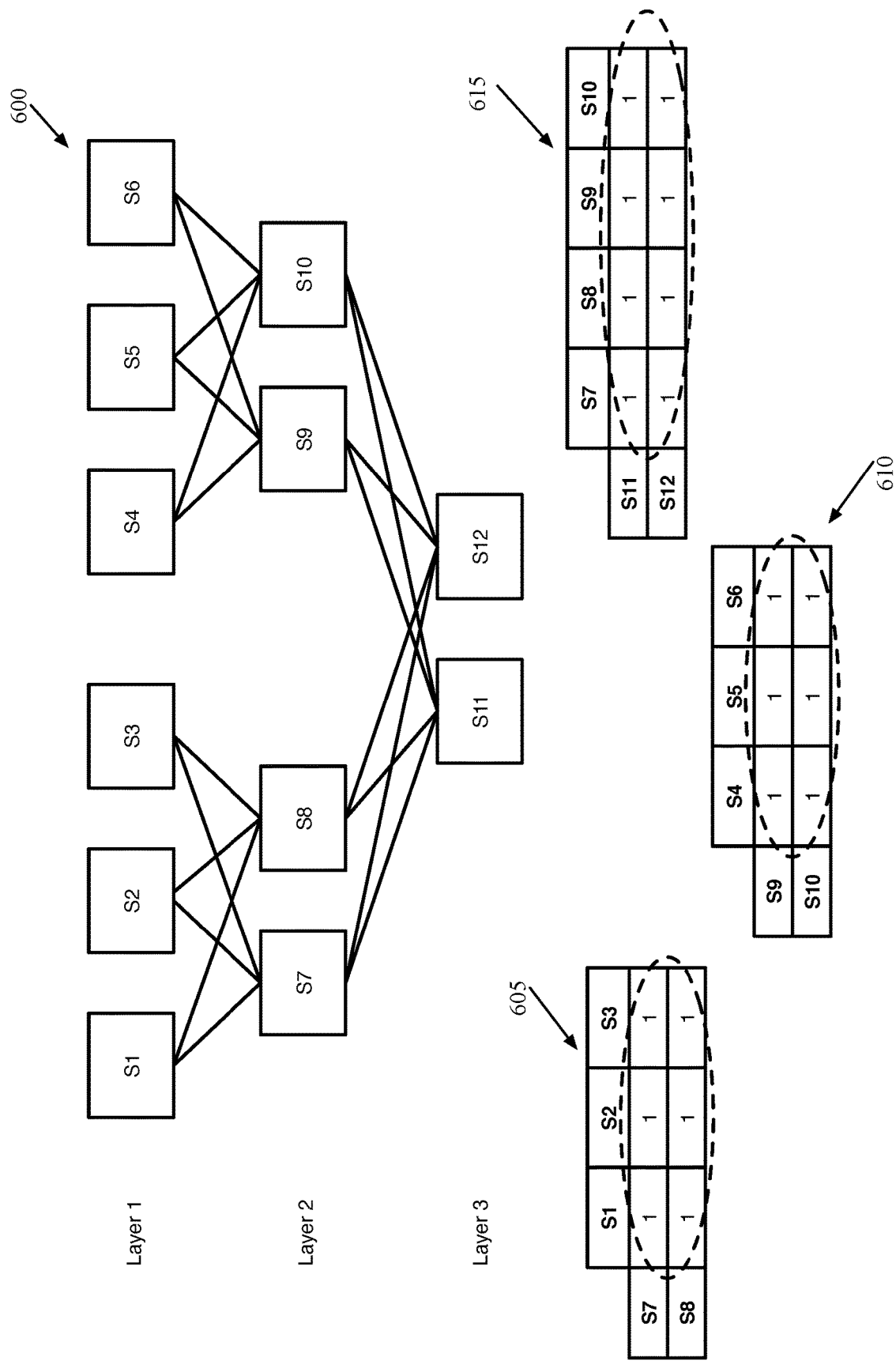
FIG. 6 conceptually illustrates an example of a three-layer network architecture in which groups are vertically joined.

FIG. 6 conceptually illustrates an example of a three-layer network architecture 600 in which groups are vertically joined. For the first two layers, two separate groups {S1, S2, S3, S7, S8} and {S4, S5, S6, S9, S10} are identified using the techniques described above, as shown in connection matrices 605 and 610. For Layer 2 and Layer 3, one group {S7, S8, S9, S10, S11, S12} is identified as shown in connection matrix 615. In this case all of the higher-layer network elements of the first two groups (S7 and S8 from the first group and S9 and S10 from the second group) are contained in the lower-layer network elements of the third group. Based on this, the three groups are amalgamated into a single three-layer group having a leaf layer, spine layer, and super-spine layer.

After evaluating all of the layers and joining groups where possible, the process 100 stores (at 145) the identified network element groups, then ends. In some embodiments, the network monitoring application uses the identified network element groups to display visualizations of the datacenter network elements. For instance, a user might want to simply view the overall network structure of a datacenter in some embodiments or view connectivity for a certain rack of hosts.

In addition, the network monitoring application of some embodiments enables a user to view data message paths within the datacenter from one DCN (e.g., a virtual machine, container, bare metal computing device, etc.) in the datacenter to another DCN. In some embodiments, these paths include both overlay network elements (indicated within the host computers) as well as physical underlay network elements. Rather than simply showing an unorganized set of network elements, the identified leaf-spine group (or groups) through which the data traffic passes can be visualized, with the specific network elements in each layer that process the traffic highlighted.

Figure 7:
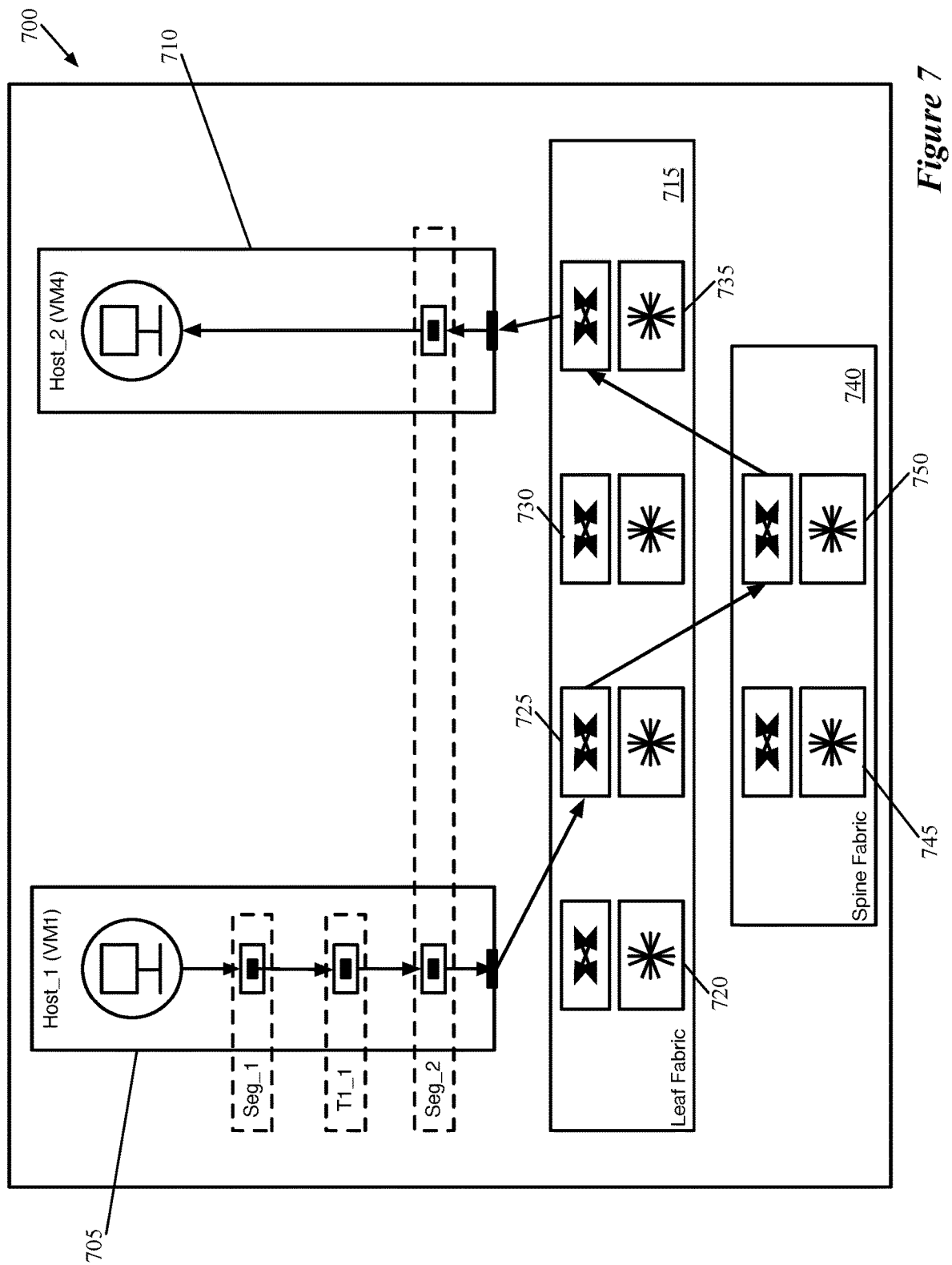
FIG. 7 illustrates an example of a graphical user interface (GUI) of some embodiments that displays a visualization of a data message path through a leaf-spine architecture.

FIG. 7 illustrates an example of a graphical user interface (GUI) 700 of some embodiments that displays a visualization of a data message path through a leaf-spine architecture. In this case, a data message (or set of data messages) is sent from a virtual machine VM1 on a first host 705 to another virtual machine VM4 on a second host 710. The visualization shows both logical overlay elements as well as the physical network elements in the relevant portion of the datacenter network. In this case, the logical overlay network elements include logical switches (segments) and a logical router implemented by sets of forwarding elements (e.g., software forwarding elements executing in virtualization software) on the host computers 705 and 710, but could also include various logical middleboxes implemented by the host computer in some embodiments. Specifically, in this example, the data message sent from VM1 is processed at host computer 705 according to a first logical switch "Seg_1", a logical router "T1_1", and a second logical switch "Seg_2".

The data message is sent from an interface of the host computer 705 to a network element 725 at the leaf layer 715 of a datacenter architecture. In this case, the network monitoring application identified a leaf-spine architecture group having a leaf layer 715 with four network elements (represented by GUI items 720-735 in the network visualization) and a spine layer 740 with two network elements (represented by GUI items 745 and 750). Some embodiments use different types of GUI items to represent switches, routers, combined switch/routers, or other network appliances (e.g., different types of middleboxes).

In some embodiments, as shown, all of the network elements of an identified leaf-spine group are represented in the visualization, rather than only showing the network elements that process a data message. This allows the user to have a view of possible paths through the network, especially if the host computers have the option (e.g., using equal-cost multi-path (ECMP routing) of sending the data message to any of the leaf network elements or, more commonly, when the leaf network elements have the option (e.g., also using ECMP routing) of sending the data message to any of the spine network elements. Some embodiments include ECMP signifiers in the network visualization when this is the case.

In the illustrated example, the data message is processed by the network element 725 and sent to a spine network element 750 (e.g., because the leaf network element 725 does not have a direct connection to the host computer 710). The spine network element 750 forwards the data message to a leaf network element 735 that does have a connection to the second host computer 710, and thus forwards the data message to an interface of this host computer 710. The host computer 710 performs logical processing for the second logical switch "Seg_2" to which VM4 connects and delivers the data message to this VM. Because the processing for the second logical switch is performed on both the source host 705 and destination host 710, a GUI item is shown stretched across both of these host computers to represent this logical segment.

In addition to the elements shown in the GUI 700, different embodiments may include various other elements in the GUI. For instance, a GUI will typically include various menus, selectable items, etc. in order to enable the user to cause the network monitoring application to perform various functions (including path detection from a source to a destination so as to produce a visualization such as shown in the figure). In addition, as part of the path visualization, some embodiments provide information about each of the logical and physical network elements that processes the data message (e.g., name, type of element, etc.).

Figure 8:
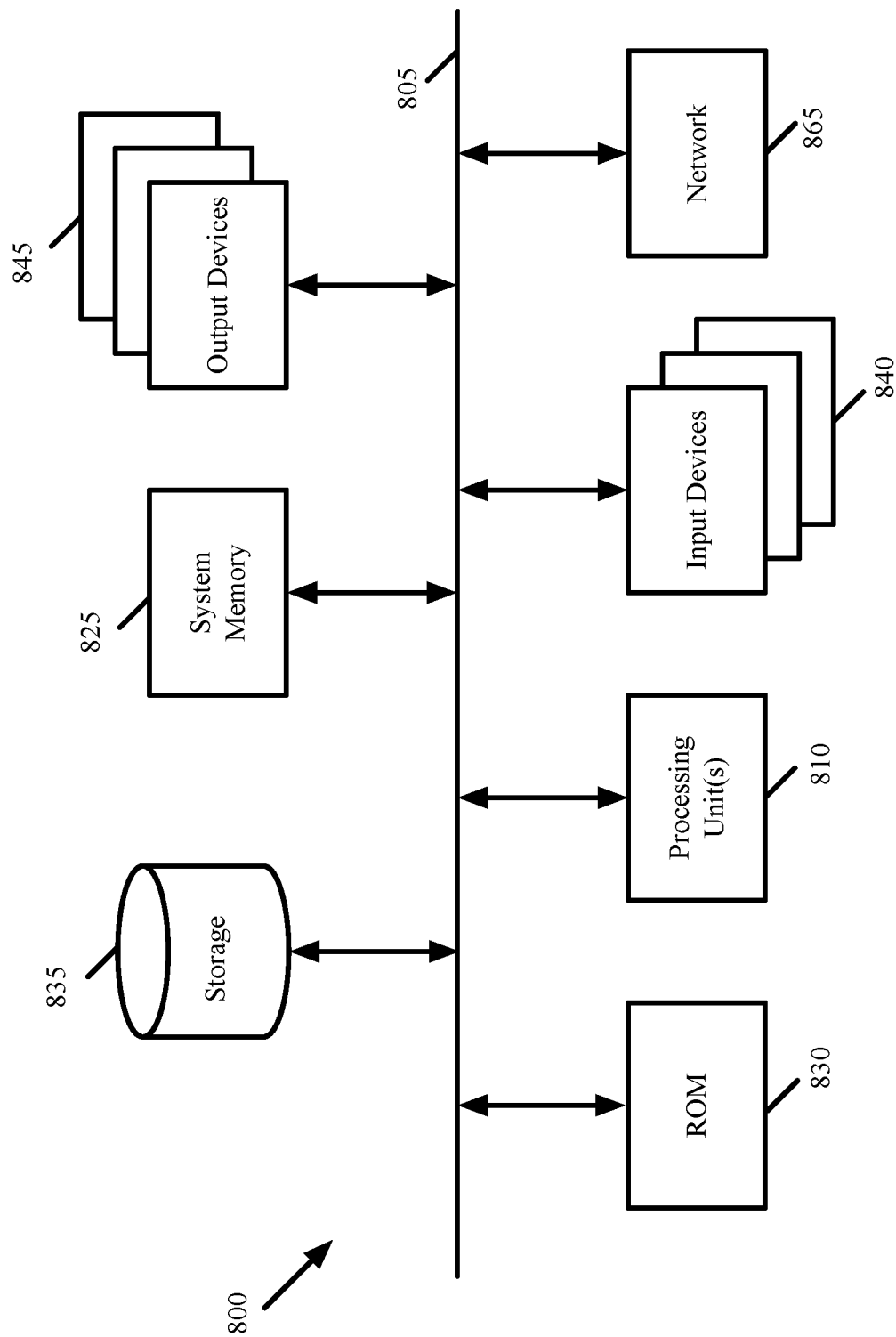
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 1) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for identifying network architecture in a datacenter, the method comprising:
    identifying connection information for a plurality of network elements, the connection information for each network element of the plurality of network elements specifying other network elements to which the network element of the plurality of network elements connects;
    using the connection information to assign each network element of a set of the network elements to one layer of a set of two or more layers based on a distance of the network element of the set of the network elements from host computers in the datacenter; and
    using the connection information to identify one or more groups of network elements organized into a particular network architecture by (i) defining a set of matrices representing connections between network elements assigned to a first layer and network elements assigned to a second layer and (ii) using the set of matrices to identify groups of network elements in which each network element in the first layer connects to each network element in the second layer,
    wherein the identified one or more groups of network elements organized into a particular network architecture are for use in displaying user interface visualizations of the plurality of network elements of the datacenter.

2. The method of claim 1, wherein the plurality of network elements are part of a datacenter underlay network that carries data traffic between host computers for a plurality of different overlay networks implemented in the datacenter.

3. The method of claim 2, wherein:
    a set of software forwarding elements executing on the host computers in the datacenter implement the different overlay networks; and
    the host computers connect to a subset of the network elements of the datacenter underlay network.

4. The method of claim 1, wherein the particular network architecture is a leaf-spine architecture, wherein each respective identified group of network elements has at least a respective set of leaf-layer network elements and a respective set of spine-layer network elements.

5. The method of claim 4, wherein the leaf-layer network elements connect to sources and destinations of data traffic and the spine-layer network elements provide connections between the leaf-layer network elements.

6. The method of claim 1, wherein the identification of the connection information does not require receiving any configuration data from the network elements.

7. The method of claim 1, wherein using the connection information to assign each network element of the set of the network elements to one layer of the set of two or more layers comprises:
    identifying a first set of network elements in the first layer that are closest to sources and destinations of data traffic in the datacenter; and
    identifying a second set of network elements in the second layer that provide connections between the first set of network elements in the first layer.

8. The method of claim 7, wherein:
    each first-layer network element of the first set directly connects to at least one second-layer network element of the second set and does not connect directly to any other first-layer network elements; and
    each second-layer network element of the second set directly connects to at least one first-layer network element of the first set and does not connect directly to any other second-layer network elements.

9. The method of claim 1, wherein:
    the set of matrices comprises a first matrix representing connections between a first set of first-layer network elements and a second set of second-layer network elements; and
    using the set of matrices to identify groups of network elements comprises using the first matrix to identify that each of the network elements in the first set of first-layer network elements connects to each of the network elements in the second set of second-layer network elements.

10. The method of claim 9, wherein using the set of matrices to identify groups of network elements further comprises identifying the first set of first-layer network elements and second set of second-layer network elements as belonging to a leaf-spine section of the datacenter.

11. The method of claim 9, wherein:
    the set of matrices further comprises a second matrix representing connections between a third set of first-layer network elements and a fourth set of second-layer network elements; and
    using the set of matrices to identify groups of network elements further comprises using the second matrix to identify that each of the network elements in the third set of first-layer network elements connects to each of the network elements in the fourth set of second-layer network elements.

12. The method of claim 11, wherein using the set of matrices to identify groups of network elements further comprises identifying the first set of first-layer network elements and the second set of second-layer network elements as belonging to a first group of network elements and the third set of first-layer network elements and the fourth set of second-layer network elements as belonging to a second group of network elements.

13. The method of claim 11, wherein the set of matrices is a first set of matrices, wherein using the connection information to identify the one or more groups of network elements organized into the particular network architecture further comprises:
    defining a second set of matrices representing connections between the network elements assigned to the second layer and network elements assigned to a third layer, wherein the second set of matrices comprises a third matrix representing connections between a fifth set of second-layer network elements and a sixth set of third-layer network elements, the fifth set of second-layer network elements comprising both the second set of second-layer network elements and the fourth set of second-layer network elements; and using the second set of matrices to identify groups of network elements in which each network element in the second layer connects to each network element in the third layer, wherein using the second set of matrices comprises:

using the third matrix to identify that each of the network elements in the fifth set of second-layer network elements connects to each of the network elements in the sixth set of third-layer network elements; and identifying the first set of first-layer network elements, third of first-layer network elements, fifth set of second-layer network elements, and sixth set of third-layer network elements as belonging to a three-layer group of network elements.

14. The method of claim 1, wherein the user interface visualization displays a data message path between a data compute node (DCN) on a first host and a DCN on a second host, the data message path passing through at least one of the network elements in an identified group.

15. A non-transitory machine-readable medium storing a program which when executed by at least one processing unit identifies network architecture in a datacenter, the program comprising sets of instructions for:

identifying connection information for a plurality of network elements, the connection information for each network element of the plurality of network elements specifying other network elements to which the network element of the plurality of network elements connects;

using the connection information to assign each network element of a set of the network elements to one layer of a set of two or more layers based on a distance of the network element of the set of the network elements from host computers in the datacenter; and using the connection information to identify one or more groups of network elements organized into a particular network architecture by (i) defining a set of matrices representing connections between network elements assigned to a first layer and network elements assigned to a second layer and (ii) using the set of matrices to identify groups of network elements in which each network element in the first layer connects to each network element in the second layer, wherein the identified one or more groups of network elements organized into a particular network architecture are for use in displaying user interface visualizations of the plurality of network elements of the datacenter.

16. The non-transitory machine-readable medium of claim 15, wherein:

the plurality of network elements are part of a datacenter underlay network that carries data traffic between host computers for a plurality of different overlay networks implemented in the datacenter;

a set of software forwarding elements executing on the host computers in the datacenter implement the different overlay networks; and the host computers connect to a subset of the network elements of the datacenter underlay network.

17. The non-transitory machine-readable medium of claim 15, wherein:

the particular network architecture is a leaf-spine architecture;

the leaf-layer network elements connect to sources and destinations of data traffic and the spine-layer network elements provide connections between the leaf-layer network elements; and each respective identified group of network elements has at least a respective set of leaf-layer network elements and a respective set of spine-layer network elements.

18. The non-transitory machine-readable medium of claim 15, wherein the set of instructions for using the connection information to assign each network element of the set of the network elements to one layer of the set of two or more layers comprises sets of instructions for:

identifying a first set of network elements in the first layer that are closest to sources and destinations of data traffic in the datacenter; and identifying a second set of network elements in the second layer that provide connections between the first set of network elements in the first layer.

19. The non-transitory machine-readable medium of claim 18, wherein:

each first-layer network element directly connects to at least one second-layer network element and does not connect directly to any other first-layer network elements; and each second-layer network element directly connects to at least one first-layer network element and does not connect directly to any other second-layer network elements.

20. The non-transitory machine-readable medium of claim 15, wherein:

the set of matrices comprises a first matrix representing connections between a first set of first-layer network elements and a second set of second-layer network elements; and the set of instructions for using the set of matrices to identify groups of network elements comprises a set of instructions for using the first matrix to identify that each of the network elements in the first set of first-layer network elements connects to each of the network elements in the second set of second-layer network elements.

21. The non-transitory machine-readable medium of claim 20, wherein the set of instructions for using the set of matrices to identify groups of network elements further comprises a set of instructions for identifying the first set of first-layer network elements and second set of second-layer network elements as belonging to a leaf-spine section of the datacenter.

22. The non-transitory machine-readable medium of claim 20, wherein:

the set of matrices further comprises a second matrix representing connections between a third set of first-layer network elements and a fourth set of second-layer network elements; and the set of instructions for using the set of matrices to identify groups of network elements further comprises a set of instructions for using the second matrix to identify that each of the network elements in the third set of first-layer network elements connects to each of the network elements in the fourth set of second-layer network elements.

23. The non-transitory machine-readable medium of claim 22, wherein the set of instructions for using the set of matrices to identify groups of network elements further comprises a set of instructions for identifying the first set of first-layer network elements and second set of second-layer network elements as belonging to a first group of network elements and the third set of first-layer network elements and fourth set of second-layer network elements as belonging to a second group of network elements.

24. The non-transitory machine-readable medium of claim 22, wherein the set of matrices is a first set of matrices, wherein the set of instructions for using the connection information to identify the one or more groups of network elements organized into the particular network architecture further comprises sets of instructions for:

defining a second set of matrices representing connections between the network elements assigned to the second layer and network elements assigned to a third layer, wherein the second set of matrices comprises a third matrix representing connections between a fifth set of second-layer network elements and a sixth set of third-layer network elements, the fifth set of second-layer network elements comprising both the second set of second-layer network elements and the fourth set of second-layer network elements; and using the second set of matrices to identify groups of network elements in which each network element in the second layer connects to each network element in the third layer, wherein the set of instructions for using the second set of matrices comprises sets of instructions for:

using the third matrix to identify that each of the network elements in the fifth set of second-layer network elements connects to each of the network elements in the sixth set of third-layer network elements; and identifying the first set of first-layer network elements, third set of first-layer network elements, fifth set of second-layer network elements, and sixth set of third-layer network elements as belonging to a three-layer group of network elements.

25. The non-transitory machine-readable medium of claim 15, wherein the user interface visualization displays a data message path between a data compute node (DCN) on a first host and a DCN on a second host, the data message path passing through at least one of the network elements in an identified group.

* * * * *